March 27, 1951 — R. J. DUFFIN — 2,546,888
PATH CHARTING APPARATUS
Filed Feb. 27, 1946 — 3 Sheets-Sheet 1

Inventor
Richard J. Duffin

Attorneys

March 27, 1951 R. J. DUFFIN 2,546,888
PATH CHARTING APPARATUS
Filed Feb. 27, 1946 3 Sheets-Sheet 3
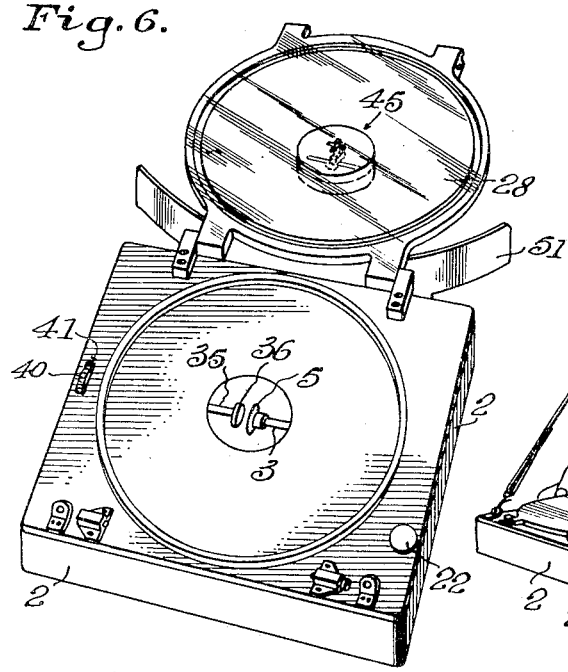
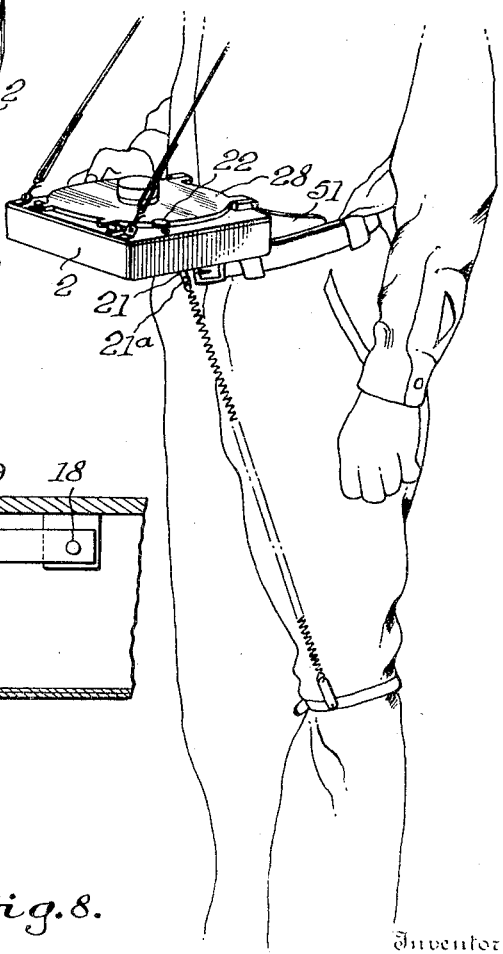
Inventor
Richard J. Duffin Patented Mar. 27, 1951

2,546,888

UNITED STATES PATENT OFFICE 2,546,888

PATH CHARTING APPARATUS

Richard J. Duffin, Washington, D. C., assignor to the United States of America as represented by the Secretary of War Application February 27, 1946, Serial No. 650,685

4 Claims. (Cl. 33—1)

1

This invention relates to the marking of paths on maps or charts, and more particularly to path marking apparatus of the semi-automatic variety, although not limited thereto.

It is among the objects of the present invention to provide an apparatus of the class described which may be easily conveyed; and which will automatically operate to make a record of the path traveled, the said record being in the form of a line drawn to scale and showing correct distances and directions.

Particular instances of use would be the mapping of the path followed by a pedestrian or equestrian traveling over any kind of terrain.

Briefly stated, the aparatus of the invention comprises a compass, a record-receiving blank having parallel lines thereon, means for turning the blank into uniform orientation by reference to the compass in conjunction with the said parallel lines, and means for making a line on the blank at a rate which is coordinate with the traversing of corresponding distances by the apparatus.

The invention, then, comprises the features hereinafter fully described and as particularly pointed out in the claims, the following description and the annexed drawings setting forth in detail certain illustrative embodiments of the invention, these being indicative of but a few of a number of ways in which the principles of the invention may be successfully employed.

In the drawings:

Figure 6 is a perspective view showing the housing with the hingedly mounted cover plate in open position;

Figure 7 is a fragmentary sectional view on the line 7—7 of Figure 2;

Figure 8 is a fragmentary view, partly in section, illustrating one of the operating instrumentalities; and Figure 9 is a perspective illustrating the manner in which the apparatus may be carried by a pedestrian.

Figure 1:
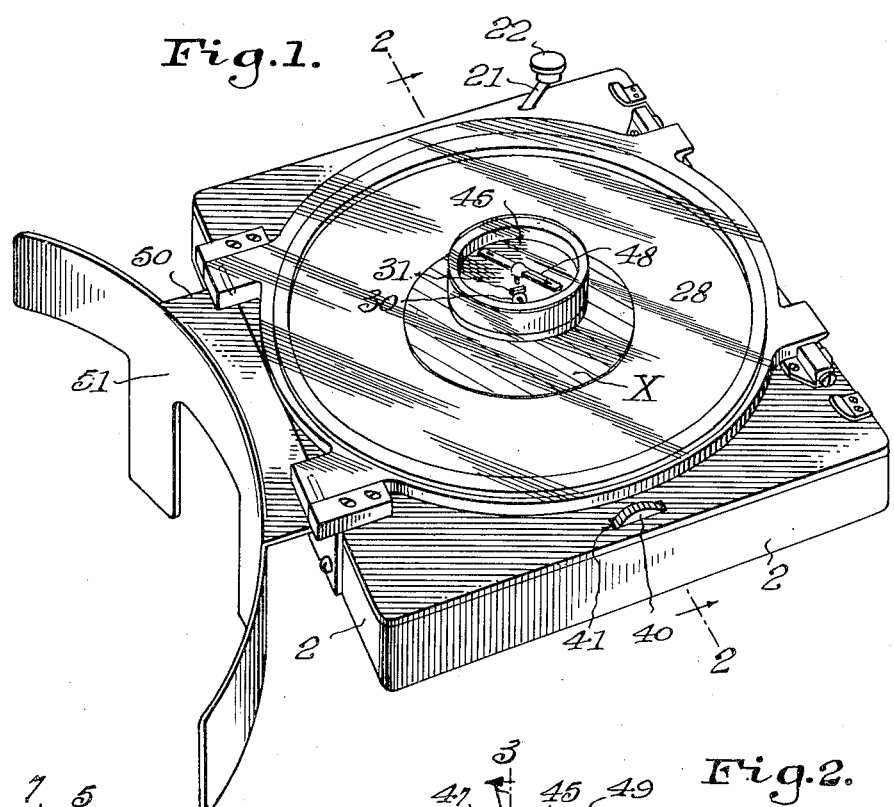
Figure 1 is a perspective of the exterior of the apparatus of the invention.

Referring more particularly to the drawings,

2 the numeral 2 designates a rectangular and relatively shallow box-like housing in and on which the apparatus of the invention is carried. Within the housing 2 there is disposed a transverse shaft 3 which is mounted in an inner bearing 4. Secured to the inner end of this shaft 3 is a distance wheel 5 which is located at the aproximate center of the apparatus. This distance wheel 5 projects through a central aperture in the top of the box-like housing 2 and is the immediate agency that moves the mapping paper, as will appear hereinafter.

The shaft 3 is journaled in an outer bearing 6 and carries at its outer end a worm wheel 7, the latter being shown as having twenty teeth. A suitably journaled shaft 9 is disposed at right angles to the shaft 3 and carries a single-thread worm 10 in engagement with the worm wheel 7. According to the foregoing construction and arrangement the shaft 3 will make one turn for every twenty turns of the shaft 9. This slows down the feed of the paper very materially, but a still further reduction in its speed is provided by a ratchet wheel 14 which is secured to the end of the shaft 9 which is opposite that carrying the single-thread worm 10. This ratchet wheel 14 is shown as having thirty-nine teeth and is adapted to be moved at a rate of either one or two teeth at each actuation in a manner which will shortly appear. Thus $39 \times 20$, or $39 \times 10$, actuations are required to cause the distance or feed wheel 5 to rotate once, depending on which rate of feed is being used at that time.

These actuations of the ratchet wheel 14 are produced by a pawl 15 which engages the ratchet wheel in one direction, and slips over them on its return in the opposite direction. The said pawl is carried by a lever 16, which is pivotally mounted, as at 18, for limited angular motion, and has an offset portion 19 adjacent the ratchet wheel 14, where the pawl is located. At its free end, the lever 16 is reduced in width as shown in Fig. 7; and the said reduced end passes through a transverse slot 20 in a plunger rod 21, so that when the said rod is pushed down by means of a finger-key 22, against the pressure of a spring 23, the lever 16 will be turned about its pivotal mounting 18. The dimensions are such that when the plunger rod 21 executes its fullest stroke, the pawl 15 will move far enough to shift the ratchet wheel 14 to the extent of two teeth. Means may be provided, however, to limit the extent of such motion to one tooth, by a stop device which is adapted to obstruct the path of said plunger when the latter has completed one-half of its stroke. This means may acceptably take the form of a simple pivotally mounted block 25 which is disposed adjacent the free end of the ratchet lever 16; and adapted to swing into a position such that it may engage and limit the throw of the latter. This results in moving the paper only one-half as fast, or in other words, the scale of the map becomes one-half as great as before.

As shown in Figures 1 and 6, the housing 2 is provided with a hingedly-mounted cover plate 28 of colorless transparent plastic material. This cover plate 28 is shown as essentially comprising a circular disk with four lugs projecting therefrom by means of which it may be conveniently and conventionally hinged and latched to the top of the box-like housing 2. In order to provide a tighter closure between the cover plate and the housing 2, the bottom of said cover plate is provided with an annular groove adjacent its periphery which is adapted to receive an upwardly projecting similarly formed ring on the top of the said housing.

Figure 2:
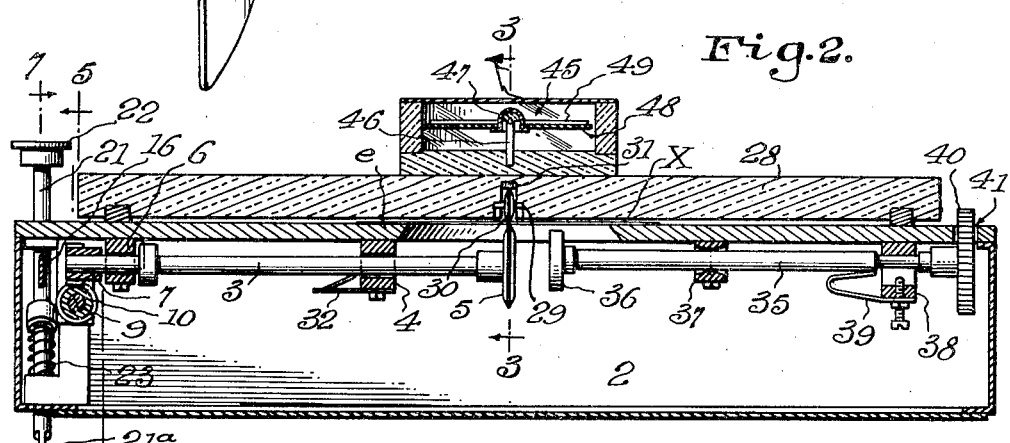
Figure 2 is a sectional view on the line 2—2 of Figure 1.
Figure 3:
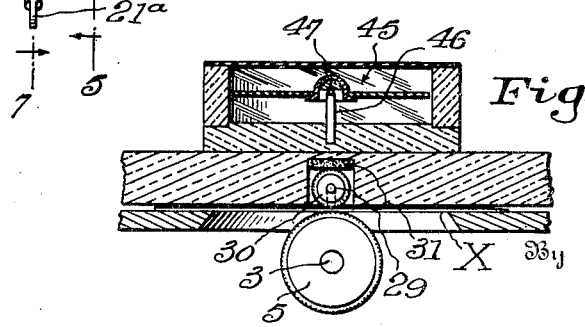
Figure 3 is a fragmentary sectional view on the line 3—3 of Figure 2.

Referring particularly to Figures 2 and 3, the transparent colorless hingedly-mounted cover plate 28 is provided on its under side with a central recess within which there is disposed a horizontal shaft 29 on which there is mounted a rotatable inking wheel 30, the latter being supplied at its periphery with ink from an adjacently disposed inking pad or wick 31.

As shown most clearly in Figure 2, the mapping paper, as indicated at X is adapted to be received between the top e of the box-like housing 2 and the bottom of the superposed cover plate 28.

A spring 32 is carried by the bearing 4 and serves to influence the shaft 3 and the distance wheel 5 toward the inking wheel 30 on the shaft 29 in the cover plate 28, the bearing 4 having its bore slightly elongated in a vertical direction to permit a little vertical play of the said shaft 3. Preferably both the distance wheel 5 and the inking wheel 30 are knurled to prevent slippage when in contact with the paper; and the diameter of the inking wheel is kept at a minimum, say one-quarter of an inch, to thereby minimize the extent of its contact with the paper. The contact of the inking wheel 30 with the top of the mapping paper while opposed to the resilient contact of the distance wheel 5 against the bottom of the mapping paper produces very satisfactory results.

A shaft 35 is disposed to extend in substantial coaxial alignment with the shaft 3 which carries the distance wheel 5. This shaft 35 terminates adjacent the distance wheel 5 and its inner end carries a friction wheel 36 which underlies the central aperture in the top of the box-like housing 2. The shaft 35 is mounted in a pair of spaced bearing blocks 37 and 38, the former (and innermost) of which is bored to flare or diverge conically from its mid-section toward each end, to thereby permit a slight rocking movement to be imparted to the shaft 35 where it projects from either side thereof. The outer bearing block 38 is provided with a vertically enlongated bore to permit substantial vertical play. This outer bearing block 38 is provided with a spring 39 to influence the outer end of the shaft 35 in an upward direction. To the outer end of the shaft 35 there is secured an operating wheel 40, the periphery of which is knurled and disposed to project through a slot 41 in the adjacent portion of the top of the box-like housing 2.

The immediately foregoing construction and arrangement enables the turning of the mapping paper X (as it overlies the central aperture in the top of the box-like housing 2) about the contact point between the distance wheel 5 and the inking wheel 30 by simply applying downward pressure and partial rotation to the peripherally knurled operating wheel 40; whereby the inner end of the shaft 35 is influenced upwardly to force the friction wheel 36 into contact with the under side of the mapping paper X and apply pressure thereto against the backing support afforded by the under side of the cover plate 28. In this manner, then, the preliminary adjustment of the mapping paper X is accomplished. The turning of the mapping paper is necessary to orient it into the correct compass direction, the said direction being indicated by a compass which will be described immediately hereinafter.

Referring more particularly to Figures 1 and 2, the transparent and colorless plastic cover plate 28 which is hingedly-mounted on the top of the box-like housing 2 carries at its center a superposed compass housing 45 which is composed of a suitable colorless transparent plastic. Within the compass housing 45 there is a centrally disposed vertically extending steel pivot pin 46 at the top of which there is disposed a jewel mounting 47 for supporting an attached compass card. In the present instance the compass card takes the form of a mica disk 48 having a north-south magnetic needle 49 secured thereto. The compass housing 48 is filled with a conventional dampening fluid, such as a light oil or kerosene, to retard the spinning tendency of the compass card and its associated magnetic needle 49.

The mapping paper X preferably has parallel lines thereon to assist in setting it parallel to the length of the magnetic compass needle 49 and also has arrow heads on some of these lines, so that if these are always made to point north, for example, there will be no possibility of inadvertently interchanging north and south directions.

When the apparatus of the invention is to be carried by the operator, a suitable fitting 50 which will conform to the shape of the body is secured to the box-like housing 2, an arcuate flange 51 catching under the belt and trouser top of the operator to support the device at a suitable level. The housing 2 is preferably further supported by straps from the operator's neck or shoulders, to keep it level.

After the operator has adjusted the mapping paper X to obtain the proper orientation with reference to the compass, all that is necessary is that he feed the said mapping paper by means of the distance wheel 5, which, like the friction wheel 36, bears against the lower surface of the paper.

Two ways of feeding the mapping paper are provided: The operator may push the finger key 22 to shift the plunger rod 21 from its upper end, using his left hand for this actuation, and pushing the key down once at every other step. The other way is more nearly automatic, and consists in attaching a harness to the left leg of the operator, by means of a strap or clamp, with a resilient connection from the harness to the lower end of the plunger rod 21, where it is attached to an eye 21a. In this case the plunger is actuated by a pull instead of a push, but nevertheless in the same downward direction in each case, and at every other step of the operator.

The orientation of the map paper should be checked about every tenth step, to make certain the direction of travel has not changed without proper recognition of, or correction for, any deviation.

Figure 4:
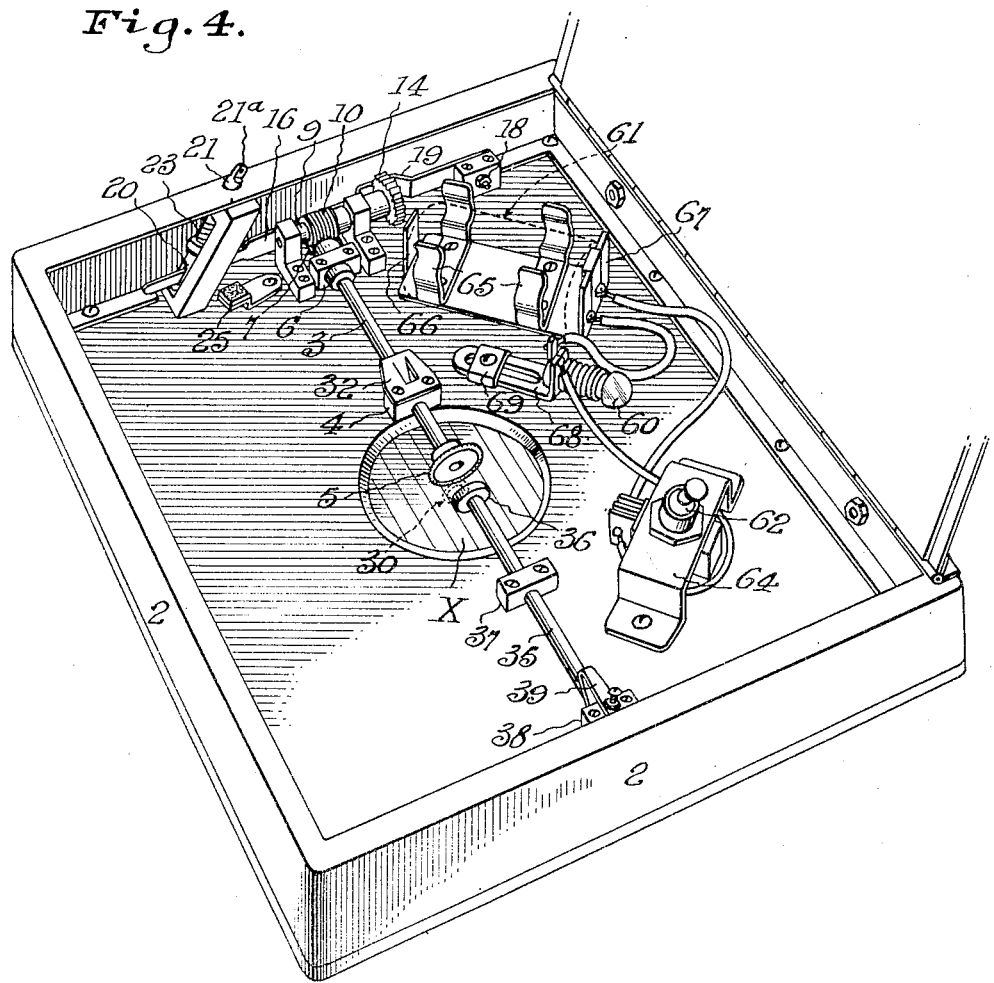
Figure 4 is an inverted perspective of the interior of the apparatus with the hingedly mounted cover in raised position.
Figure 5:
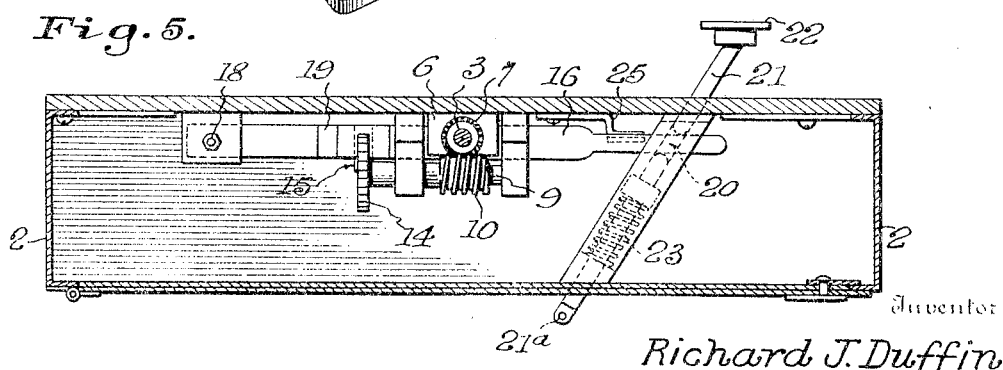
Figure 5 is a sectional view on the line 5—5 of Figure 2.

Referring particularly to Figure 4, the interior of the box-like housing 2 may be provided with illuminating means to aid in the operation of the apparatus of the invention. More specifically, this illuminating means may comprise a lamp 60, a single dry cell 61, a manually-operable switch 62 and suitable connecting wires. A bracket 64 may be used to hold the switch 62 in place; and a pair of resilient C clips 65, attached to the under side of the top of the housing 2, may be used to support the dry cell 61 in operative position. Other resilient means, such as the strips 66 and 67, may be used to engage the top and bottom of the dry cell, so as to hold it against axial shifting movement while at the same time serving as electrical connections. The lamp 60 may be adjusted by means of a slotted bracket 68 which holds its socket; and a securing means 69 may be used to hold the bracket to the under side of the top of the housing 2.

Having thus described my invention, what I claim as new and wish to secure by Letters Patent is:

1. An apparatus for plotting the course and distance traveled by a transporting means carrying the said apparatus, said apparatus comprising a housing having a central upper opening therein, a cover plate mounted upon said housing over said opening and spaced sufficiently from said housing to receive a mapping blank therebetween, means for attaching the housing to said transporting means, an inking wheel supported by said cover plate, a feed wheel supported by said housing at said opening, said feed wheel and said inking wheel being adapted to receive therebetween an intermediately disposed mapping blank, means in connection with said transporting means for imparting rotation to said feed wheel at a rate which is proportional to the rate at which said transporting means is traveling, a liquid filled compass mounted upon said cover plate, and manually-operable means for orienting said mapping blank in accordance with indications of said compass.

2. An apparatus for plotting the course and distance traveled by a transporting means carrying the said apparatus, said apparatus comprising a housing having an opening in the top thereof, means for attaching the housing to said transporting means, a cover plate supported by said housing over said opening and spaced from said housing to allow for the reception of a mapping blank, an inking whel supported by said cover plate, a feed wheel mounted within said housing at said opening and bearing tangentially and resiliently against said inking wheel, said feed wheel and said inking wheel being adapted to receive therebetween and intermediately thereof said mapping blank, means in connection with said transporting means for imparting rotation to said feed wheel at a rate proportional to the rate at which said apparatus is traveling, a compass mounted on said cover plate, and a manually-operable means for orienting said mapping blank in accordance with indications on said compass, the direction of rotation of said feed wheel being such as to move said mapping blank in a direction which is opposite to the direction being traveled by the apparatus.

3. An apparatus for plotting the course and distance traveled by a transporting means carrying the said apparatus, said apparatus comprising a housing having a central upper opening therein, a cover plate mounted upon said housing over said opening and spaced sufficiently from said housing to receive a mapping blank therebetween, means for attaching the housing to said transporting means, an inking wheel supported by said cover plate, a feed wheel supported by said housing at said opening, said feed wheel and said inking wheel being adapted to receive therebetween an intermediately disposed mapping blank, means in connection with said transporting means for imparting rotation to said feed wheel at a rate which is proportional to the rate at which said transporting means is traveling, a liquid filled compass mounted upon said cover plate, and a friction wheel connected to a rockably mounted rotatable shaft provided with a manually operated operating wheel, said friction wheel being adapted to engage the surface of said mapping blank to orient the same in accordance with the indications of said compass.

4. An apparatus for plotting the course and distance traveled by a transporting means carrying the said apparatus, said apparatus comprising a housing having an opening in the top thereof, means for attaching the housing to said transporting means, a cover plate supported by said housing over said opening and spaced from said housing to allow for the reception of a mapping blank, an inking wheel supported by said cover plate, a feed wheel mounted within said housing at said opening and bearing tangentially and resiliently against said inking wheel, said feed wheel and said inking wheel being adapted to receive therebetween and intermediately thereof said mapping blank, means in connection with said transporting means for imparting rotation to said feed wheel at a rate proportional to the rate at which said apparatus is traveling, a compass mounted on said cover plate, a manually rotatable shaft pivotally mounted beneath said cover plate and a friction wheel connected to said shaft, said friction wheel being adapted to engage the surface of said mapping blank to orient the same in accordance with the indications of said compass.

RICHARD J. DUFFIN.

REFERENCES CITED

The following references are of record in the file of this patent:

UNITED STATES PATENTS

| Number | Name | Date |
| --- | --- | --- |
| 30,528 | Collier | Oct. 30, 1860 |
| 709,313 | Ferguson | Sept. 16, 1902 |
| 1,401,242 | DeLavaud | Dec. 27, 1921 |
| 1,427,267 | Delavaud | Aug. 29, 1922 |
| 1,453,377 | Campbell | May 1, 1923 |
| 2,369,922 | Shamah | Feb. 20, 1945 |

FOREIGN PATENTS

| Number | Country | Date |
| --- | --- | --- |
| 554,835 | Great Britain | July 21, 1943 |